US006738418B1

(12) United States Patent
Stiscia et al.

(10) Patent No.: US 6,738,418 B1
(45) Date of Patent: May 18, 2004

(54) METHOD AND APPARATUS FOR ADAPTIVE DATA ALLOCATION IN A MULTI-CARRIER COMMUNICATION SYSTEM

(75) Inventors: James J. Stiscia, Garner, NC (US); Raymond Chen, Raleigh, NC (US)

(73) Assignee: Virata Corporation, Raleigh, NC (US)

( * ) Notice: Subject to any disclaimer, the term of this patent is extended or adjusted under 35 U.S.C. 154(b) by 0 days.

(21) Appl. No.: 09/541,715

(22) Filed: Apr. 3, 2000

(51) Int. Cl.[7] ................................................ H04L 5/14
(52) U.S. Cl. ..................... 375/222; 375/219; 370/290
(58) Field of Search ............................. 375/219, 222, 375/231, 259, 260, 261, 285, 295, 296, 298, 316, 346, 348, 350; 370/278, 281, 286, 288, 290, 292, 295, 465, 468, 480, 484, 526; 379/93.01, 27.01, 27.03, 31, 1.04, 3, 22.02, 406.01, 406.02, 406.05, 406.07, 406.08, 406.1, 406.14

(56) References Cited

U.S. PATENT DOCUMENTS

| | | | | |
|---|---|---|---|---|
| 4,999,830 A | * | 3/1991 | Agazzi ........................ 370/286 |
| 5,528,625 A | * | 6/1996 | Ayanoglu et al. ............ 375/222 |
| 5,757,803 A | * | 5/1998 | Russell et al. ............... 370/494 |
| 5,793,864 A | * | 8/1998 | Ramsden ................. 379/406.12 |
| 6,058,162 A | * | 5/2000 | Nelson et al. ............ 379/22.04 |
| 6,219,378 B1 | * | 4/2001 | Wu .............................. 375/231 |
| 6,396,872 B1 | * | 5/2002 | Sugiyama .................... 375/232 |
| 6,404,806 B1 | * | 6/2002 | Ginesi et al. ................ 375/222 |
| 6,442,195 B1 | * | 8/2002 | Liu et al. ..................... 375/220 |
| 6,442,275 B1 | * | 8/2002 | Diethorn ................. 379/406.14 |
| 6,542,477 B1 | * | 4/2003 | Pal et al. ..................... 370/286 |
| 6,546,090 B1 | * | 4/2003 | Bremer et al. ............ 379/93.08 |

* cited by examiner

*Primary Examiner*—Khai Tran
*Assistant Examiner*—Khanh Cong Tran
(74) *Attorney, Agent, or Firm*—Jones Day

(57) ABSTRACT

An xDSL modem having an adaptively adjustable guard band comprising a finite number of spaced-apart frequency bins between the upstream and downstream frequencies. The guard band is adjusted by selecting one from among a plurality of filters belonging to a filter bank of the receiver circuitry. A weighted loss in data capacity is calculated when each of the candidate filters are used, and the filter which gives the lowest loss in data capacity, subject to certain criteria, is used. The adjustment is made pursuant to noise and signal characteristics measured during start or restart of an xDSL communications session.

22 Claims, 9 Drawing Sheets

METHOD AND APPARATUS FOR ADAPTIVE DATA ALLOCATION IN A MULTI-CARRIER COMMUNICATION SYSTEM

RELATED APPLICATIONS

NONE

1. Technical Field

The present invention is generally related to the field of digital communications across a transmission line. It is particularly suited to xDSL implementations which use two-wire to four-wire conversion to allow full duplex operation. Thus, the present invention applies to ADSL Lite (ITU G.992.2), ADSL DMT, (ITU G.992.1) and ANSI T1.413 Issue 2, among others.

2. Background of the Invention xDSL modems, such as ADSL, HDSL, SDSL and VDSL, among others, are well-known in the prior art. In such modems, a signal is sent over a twisted pair communication line which links a first transceiver to a second transceiver. A pair of xDSL modems arranged to communicate with each other use at least one established communication protocol.

One common communication protocol, found in ADSL and VDSL modems, is discrete multitone (DMT) modulation. In DMT modulation, an xDSL transmitter typically takes a complex-valued signal and places it for transmission in a DMT bin. The signal's coordinates in the complex plane signify the information that is to be sent to the receiver. Thus, in a typical protocol, one encodes two bits (00, 01, 10 or 11) per frequency bin using the complex plane. In DMT modulation, the signals typically comprise N discrete tones simultaneously carried over the twisted pair. The collection of discrete tones is commonly referred to as a symbol, and a sequence of such symbols containing a cyclic prefix, are transmitted in xDSL communications over a predetermined number of frequency bins, typically 128, 256 or 512, depending on the standard. The symbol can be sent downstream (from the ATU-C to the ATU-R) using a higher range of frequencies, or sent upstream (from the ATU-R to the ATU-C) using a lower range of frequencies. A more detailed description of xDSL communication, xDSL transceivers and equalizers can be found in U.S. Pat. No. 5,285,474 and U.S. Pat. No. 5,479,447, both to Chow et al., whose contents are incorporated by reference to the extent necessary to understand the present invention.

Much of a modem's communication functions are under the control of a signal processor. These communication functions may include such things as modulating and demodulating signals, echo cancellation, clipping mitigation, and filtering, among others. Thus, the signal processor is used to convert the transmitted and received digital signals from one form to another. The signal processor is typically implemented through a combination of hardware and executable software code. In the usual case, the signal processor includes a programmable computer, perhaps implemented as a reduced instruction set (RISC) computer, which handles only a handful of specific tasks. The processor is typically provided with at least one computer readable medium, such as a PROM, flash memory, CD-ROM, optical drive, hard drive, floppy drive or other non-volatile memory to store firmware and executable software code. The computer will usually also have a second computer readable medium, such as associated RAM or other volatile memory to provide workspace for data and additional software. The software code may all run on a single processor or controller, or may be distributed over two or more such processors or controllers.

In a given xDSL session between a pair of modems, the different frequency bins may experience different line noise levels. The noise level may depend on such factors as the crosstalk from other twisted pairs in a cable binder, and far end modem internal noise leakage, among other things, while the received signal level may depend on the length of the twisted pair transmission line. In the typical case, most frequency bins will have a signal-to-noise ratio that is sufficiently high to permit them to be used to transmit data. Other frequency bins, however, may have SNRs that are too low and so these frequency bins may not be used. These unused frequency bins represent bandwidth that is lost, and so it is generally recognized that the number of unused bins should be kept to a minimum, subject to maintaining good signal quality.

FIG. 1 shows a typical xDSL communication system 100 showing a central office modem 102, commonly designated CO or ATU-C (ADSL transmission unit-Central), connected to a remote customer premises equipment modem 104, commonly designated CPE or ATU-R (ADSL transmission unit-remote). The two modems 102, 104 are connected by a twisted pair transmission line 106, typically formed from copper or other conductor. The length of the twisted pair may vary, but is typically on the order of less than 20,000 feet, the length being dictated by the signal level transmitted from the far end transmitter, the cable attenuation of the transmitted signal, and the level of noise at the receiver Usually, in xDSL systems, one speaks of the "loop reach", which expresses the allowable separation between the ATU-C and the ATU-R at various data transmission rates, e.g., 12,000 ft @ 1 Mbit/sec, 14,000 feet @ 900 Kbit/sec). Longer loop reach generally means that one can serve more customers, and so it is considered to be desirable to extend the loop reach as much as possible, while still maintaining good data rates.

Although modem 102 and modem 104 may have some differences due to the nature of their roles, one at ATU-C and the other at ATU-R, they have many characteristics and capabilities in common. Both modems have EMI and safety circuitry $110a$, $110b$, line transformer and associated filters $112a$, $112b$, and a hybrid circuit $114a$, $114b$ which couples the two wires' differential mode signal from the twisted pair to the four wires (two each for the transmitter circuitry and the receiver circuitry). In addition, each has receiver circuitry $116a$, $116b$ comprising one or more amplifiers and filters, and also transmitter circuitry $118a$, $118b$, also comprising one or more amplifiers and filters.

The transmitter circuitry typically includes a line driver and filter. The filtering is the combination of analog and digital frequency/time domain shaping. The filtering limits the energy contained in the regions above and below the transmitter pass band frequencies. In the case of FDM ADSL located at the remote site ATU-R, the low pass transmitter filtering limits the upstream generated signal energy which falls into the same frequency spectrum as the downstream receive spectrum. The low pass filtering does not limit the harmonic and inter-modulation distortion generated by the line driver which falls into the receive bandwidth. The upstream signal is transferred to the twisted pair interface via the hybrid. The hybrid is a 2-wire to 4-wire converter in which the 2-wire twisted pair transmission line interface is converted to a 2-wire receiver interface and a 2-wire transmitter interface.

In most modems, some transmitter energy couples from the transmitter into the receiver via the hybrid. This is called "echo". In general, a designer of an xDSL modem does not know what the local echo power and the external noise energy in the same frequency band will be, since these parameters are a function of the operating environment. As such, it is common practice for a large "guard band" to be inserted between the upstream and the downstream transmit spectrums. The result is less stringent hardware implementation requirements for such items as A/D and D/A converters, analog filters, amplifiers, etc., but at the expense of a significant loss of data capacity for the modem user since no data can be carried within the guard band.

FIG. 2 shows a hypothetical channel for an ATU-R in which bins 6–29 are used for transmitting and bins 37–127 are used for receiving. The bins between 29 and 37 are not used because of the out-of-band energy 120 from the transmitter. Thus, these bins form a guard band, which represents unused bandwidth, and it is generally recognized that it is advantageous to reduce the width of this guard band to the extent possible. As also seen in FIG., 2, despite the presence of the guard band, some of the transmitter energy may still leak into the bins used by the ATU-R receiver. The amount of reduction of this energy between the transmitter output port and the receiver input port of the hybrid is known as trans-hybrid loss.

In the design of ADSL transceivers, it is generally preferred that the hybrid circuitry minimize the local transmitter energy that couples into the local receiver. Minimizing local transmitter energy into the local receiver reduces the dynamic range that the receiver must handle and improves the signal-to-interference (SNI) ratio. This results in an analog front end (AFE) requiring fewer analog-to-digital (ADC) bits in order to recover the desired signal from the far end transmitter, and also provides greater data carrying capacity for the end user.

While minimizing this energy coupling, it is also desirable that the hybrid circuitry operate at the best impedance match possible to the twisted pair transmission line. The impedance presented at the line interface of an ADSL transceiver is a function of the twisted pair makeup and topology. This impedance can vary widely from loop to loop and a designer has no control over the range which a transceiver may need to operate.

The hybrid is typically a simple resistor, capacitor and inductor circuitry, normally fixed in value. As such, the trans-hybrid loss is a function of the termination impedance mismatch between the modem and the twister pair transmission line. Typical values range from a 6 dB trans-hybrid loss for a poorly matched condition to 40 dB for a well matched condition. A wide range of termination impedances are provided to a modem by the twisted pair transmission line due to varying cable gauges, bridged taps, and other variable characteristics. As such, for a worst-case condition in a modem compliant with the G.992.1 or G.992.2 standard, it is possible for the upstream signal to couple into the receiver at a level as high as about +7 dBm.

On an 18 kfeet loop (equivalent 26 AWG twisted pair) the received signal power at the twisted pair line interface would be only –60 dBm. The wide difference between undesired upstream echo power and desired downstream receive signal power requires system and hardware level tradeoff choices.

Typically, a system level choice is made to insert a guard band between upstream and downstream signals. A common choice is to limit the upstream transmitter to a maximum tone index of 29 and the first downstream receive tone to an index of 37. Since tones 30 through 36 can not be used, this results in a loss of data capacity for both the upstream and downstream channels. The hardware dynamic range implications which result are conflicting in terms of needing a low noise floor and low inter-modulation distortion levels in the receive band. Placing a receive high pass filter (i.e. rejecting upstream transmit signals) prevents distortion components from being generated between the upstream and downstream signals in the receive amplifier. However, the loss associated with this filter, if placed before the first active amplifier device, limits the receive sensitivity. Therefore, at the receiver, the filtering is typically split between a pre-amplifier filter 130 and a post-amplifier filter 132 on either side of the amplifier 134, as seen in FIG. 3. However, since there is no feedback mechanism to adjust filtering, and these filters are fixed in frequency location, non-optimal use of the channel spectrum results.

SUMMARY OF THE INVENTION

The present invention is directed to an xDSL modem which is configured to minimize the number of guard bins between the transmitter's and receiver's frequency range.

In one aspect of the invention, the modem is configured to measure channel noise at the commencement of a session, and then select the width of the guard band in response to the measured channel noise.

In another aspect of the invention, the modem is provided with a receiver having a bank of filters, each filter having a cut-off frequency within a frequency band situated between an upstream and a downstream channel associated with said modem; and a controller configured to selectively invoke one of the filters from the bank of filters in response to measurements of one or more of the following: background noise level, local transmitter echo, and channel loss.

In another aspect, the invention is directed to an xDSL modem having a computer readable medium on which is stored executable software code which includes code to make certain noise-related measurements, calculating one or more values from these measurements and selecting one from among a plurality of filters, based on these values.

In another aspect, the present invention is directed to a process for choosing the width of a guard band between the upstream and downstream frequencies in an FDM communication device, by making certain noise-related measurements, calculating one or more values from these measurements and selecting one from among a plurality of filters, based on these values.

BRIEF DESCRIPTION OF THE DRAWINGS

The present invention can better be understood through the attached figures in which.

DETAILED DESCRIPTION OF THE INVENTION

Figure 1:
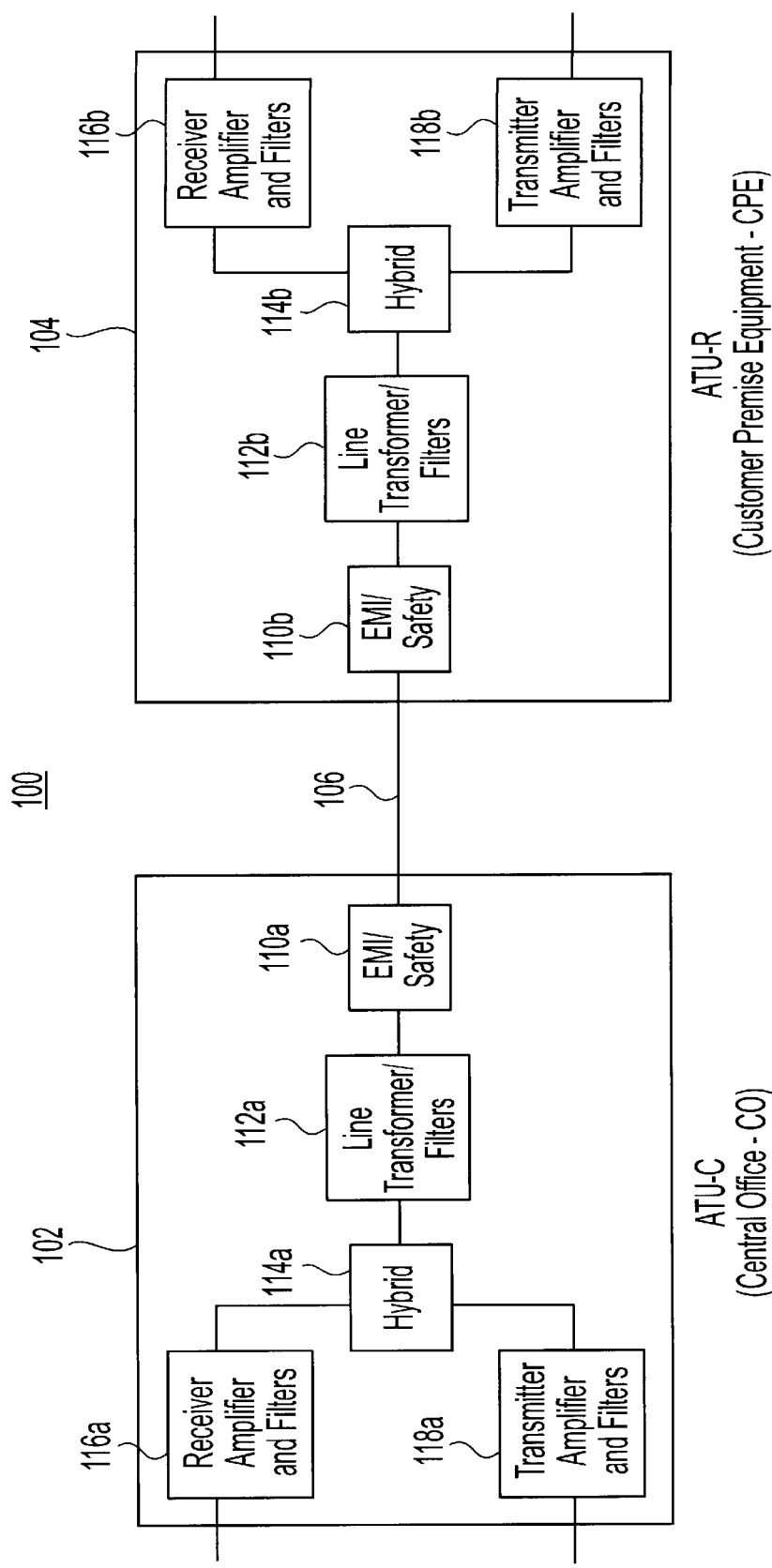
FIG. 1 is a block diagram of a prior art xDSL modem.
Figure 2:
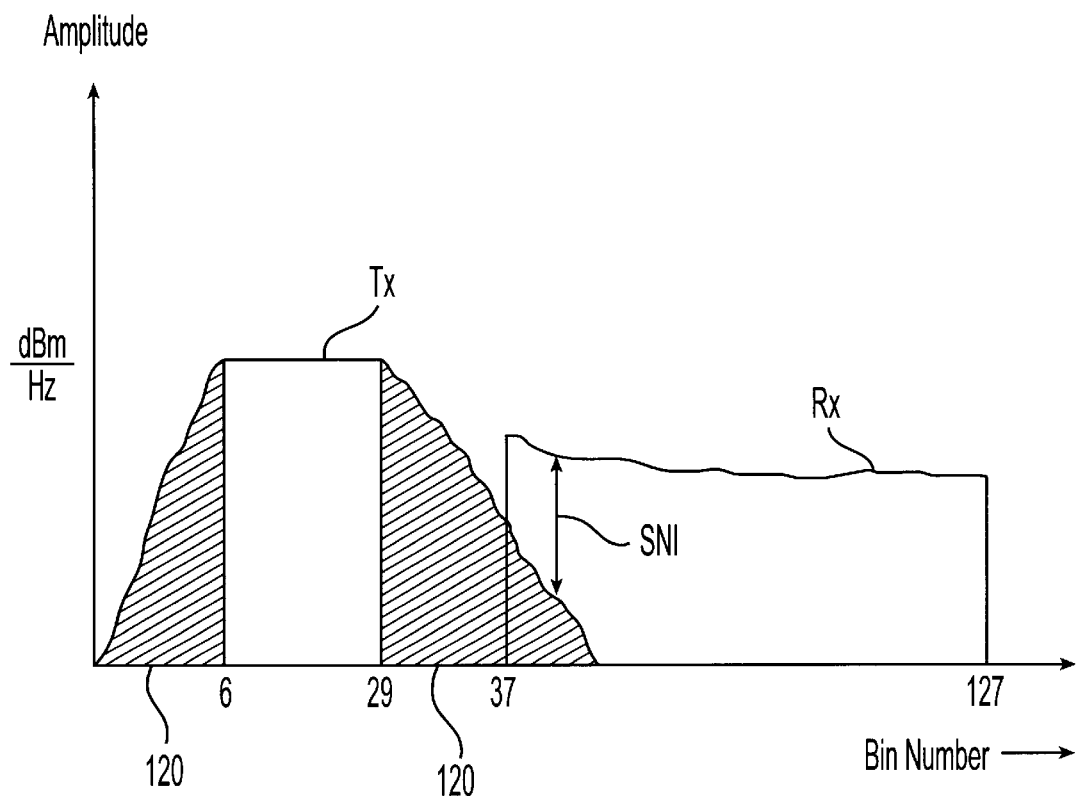
FIG. 2 shows the transmit and receive characteristics of a hybrid circuit of a typical ATU-R modem.
Figure 3:
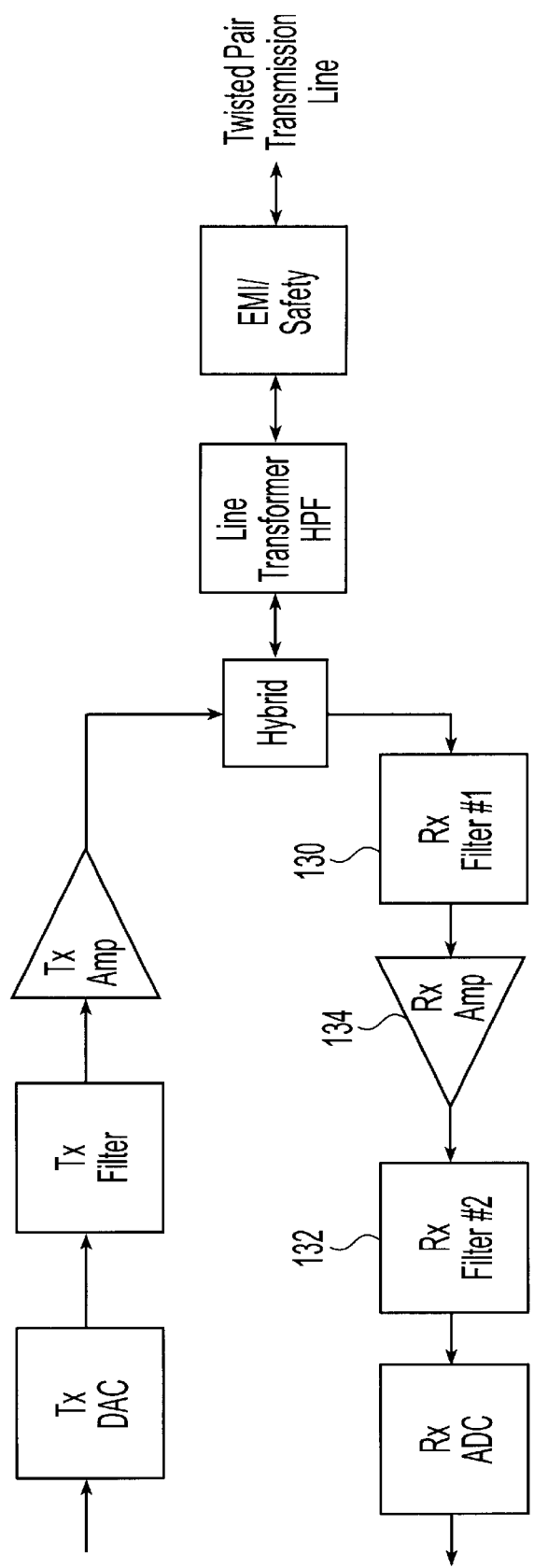
FIG. 3 is a block diagram showing the filter locations in the front end of a typical xDSL modem.
Figure 4:
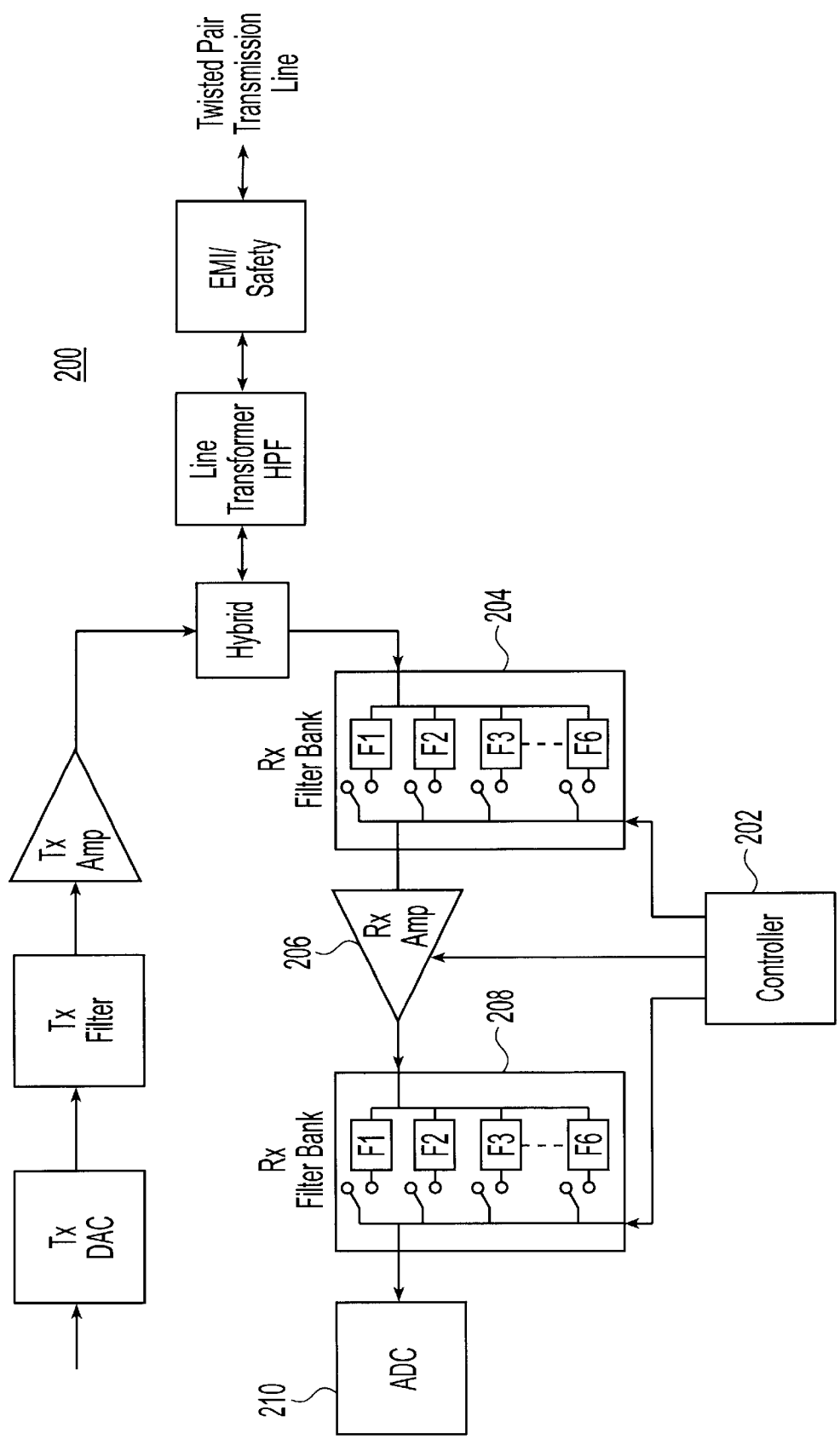
FIG. 4 is a block diagram showing the filter control in the front end of an xDSL modem in accordance with the present invention.

FIG. 4 shows a block-diagram of the front end of an xDSL modem 200 in accordance with the present invention, As seen in the embodiment of FIG. 4, the modem 200 is configured to adaptively adjust the receive filtering cut-off frequencies. This is done by sending a first control signal from a controller or processor 202 of the modem to a pre-amplifier receiver filter bank 204 to selectively choose one from among a plurality of high-pass cut-off frequencies, represented by F1, F2, etc. While the filter bank 204 of FIG. 4 only shows six discrete filters (one each to border frequency bins 32–37), it should be understood that any number of discrete filters may be selectively activated by the controller 202, the number usually depending on the width of the maximum guard ban that is allowed. In a preferred embodiment, the filters F1, F2, etc., are implemented using a combination of RC and LC filters. The filters may comprise discrete components, such as resistors, capacitors and inductors. The controller may also send a second control signal to the receiver amplifier 206 to tune the amplifier gain to further the purposes and implementation of the present invention. Finally, the controller may also send a third control signal to a post-amplifier receiver filter bank 208, whose output is sent on the receiver's ADC 210.

While in the above described embodiment, discrete components are used in the filter bank, it should be kept in mind that more sophisticated components may be used, instead. In these more sophisticated implementations, one or more filter components are tunable so as to form a single filter which covers all the needed cut-offs. For example a varactor may be used to vary the capacitance in a tunable RC circuit and a gyrator may by used to vary the inductance in a tunable RL circuit, both when used in combination with a resistor. Such a varactor or gyrator would be controlled by the controller so as to adjust the cut-offs. Preferably, such tunable devices would be highly linear so as to provide fine control of the filter cut-off.

Figure 5:
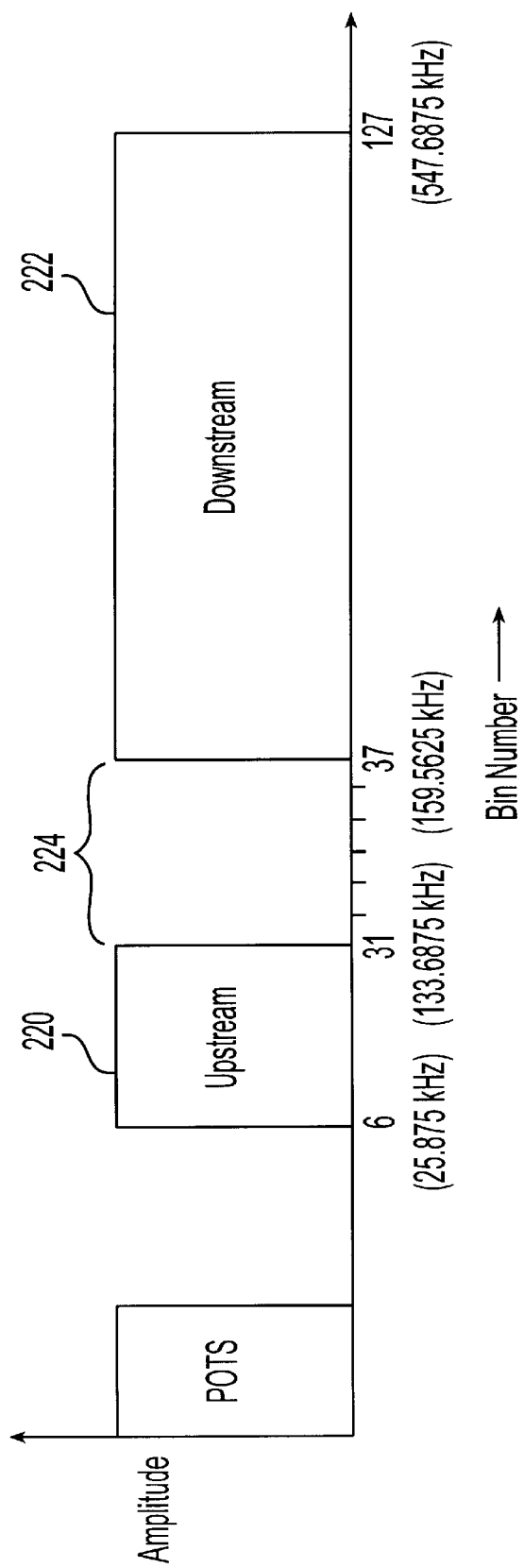
FIG. 5 shows/a hypothetical channel allocation diagram for an xDSL modem.

Regardless of how the filtering is implemented, the cut-off frequencies for the filters F1, F2, etc. preferably correspond to midpoints between discrete frequency bins in the guard band specified for a particular modem. For example, an xDSL modem having the frequency specifications shown in FIG. 5 has 128 bins covering frequencies from DC to 547.6875 kHz and the bins have a spacing of 4.3125 kHz, with midpoints between two adjacent bins being 2.15625 kHz from either bin. If such a modem used bins 6–31 for upstream transmission 220 and bins 37–127 for downstream transmission 222, then a guard band 224 of bins 32–36 would be provided. In such case, the high pass filters F1, F2, . . . , F6 would have cut-offs at bin boundaries 31.5, 32.5, 33.5, 34.5, 35.5 and 36.5, respectively. Thus, F1 would have a cut-off at 135.84375 kHz and filters F2–F6 would have cut-offs at every 4.3125 kHz thereafter, with F6's cut-off being at 157.40625 kHz. While in the preferred embodiment the midpoints, or mid-tones are used for cut-off, one skilled in the art should readily recognize that other cut-off frequencies maybe used instead.

The selection of the filter to be used is based directly or indirectly on measurements of such things as background noise, local transmitter echo, and channel loss. In a first preferred embodiment, the measurement mechanism receives two different types signals during separate time periods: (1) a first, quiet period where neither the ATU-C nor the ATU-R is transmitting, to obtain the background noise level and the crosstalk noise environment, the latter of which is typically caused by coupling between pairs of cables to create near-end (NEXT) and far-end (FEXT), and (2) a second, locally active period in which only a local transmitter is active, so as to determine local echo power. These measurements enable one to choose a filter cut-off frequency that provides improved line data capacity.

Figure 6A:
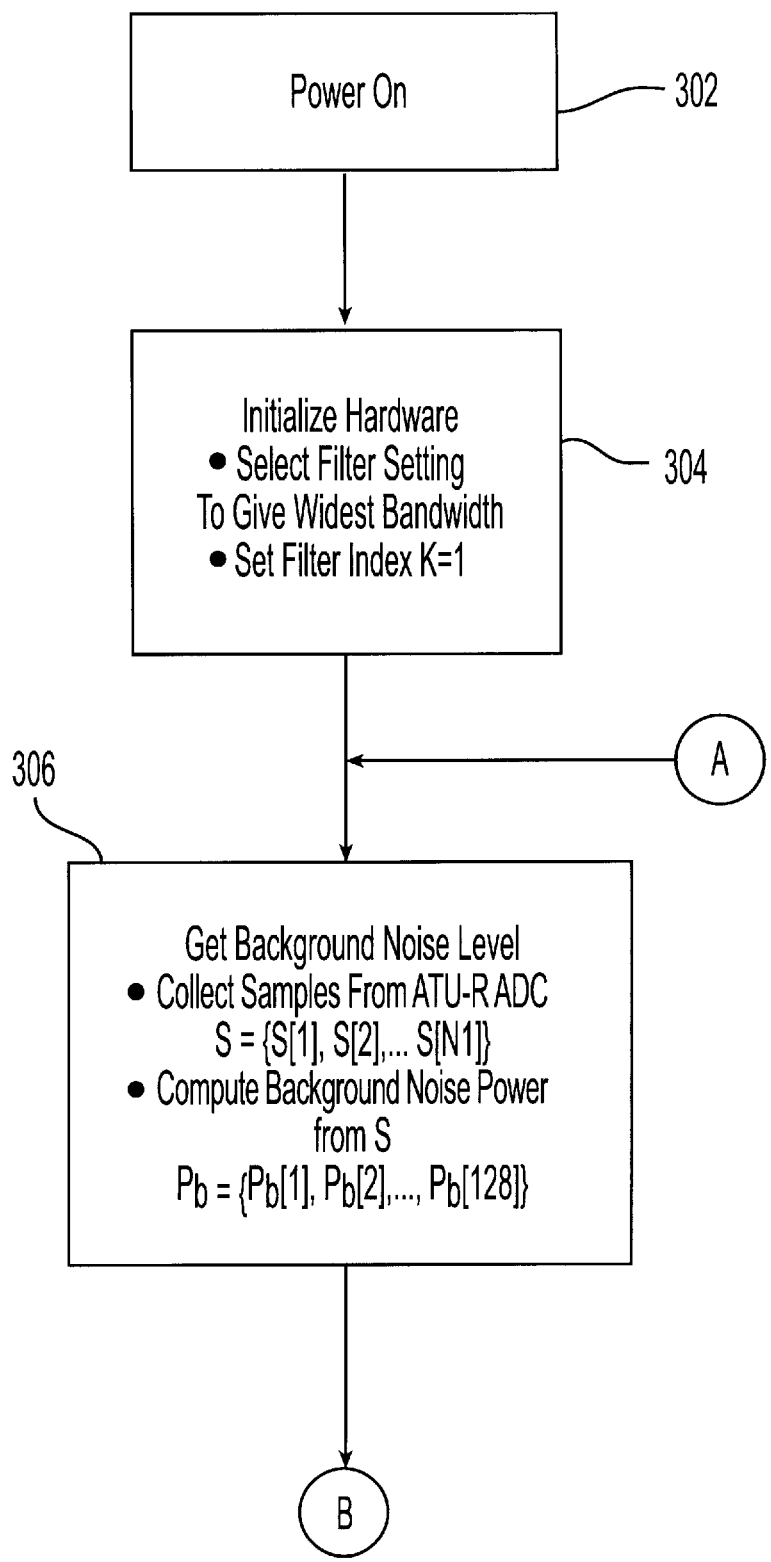
FIGS. 6A–6C present a flow chart of the steps involved in selecting one from among the candidate filter banks.
Figure 6B:
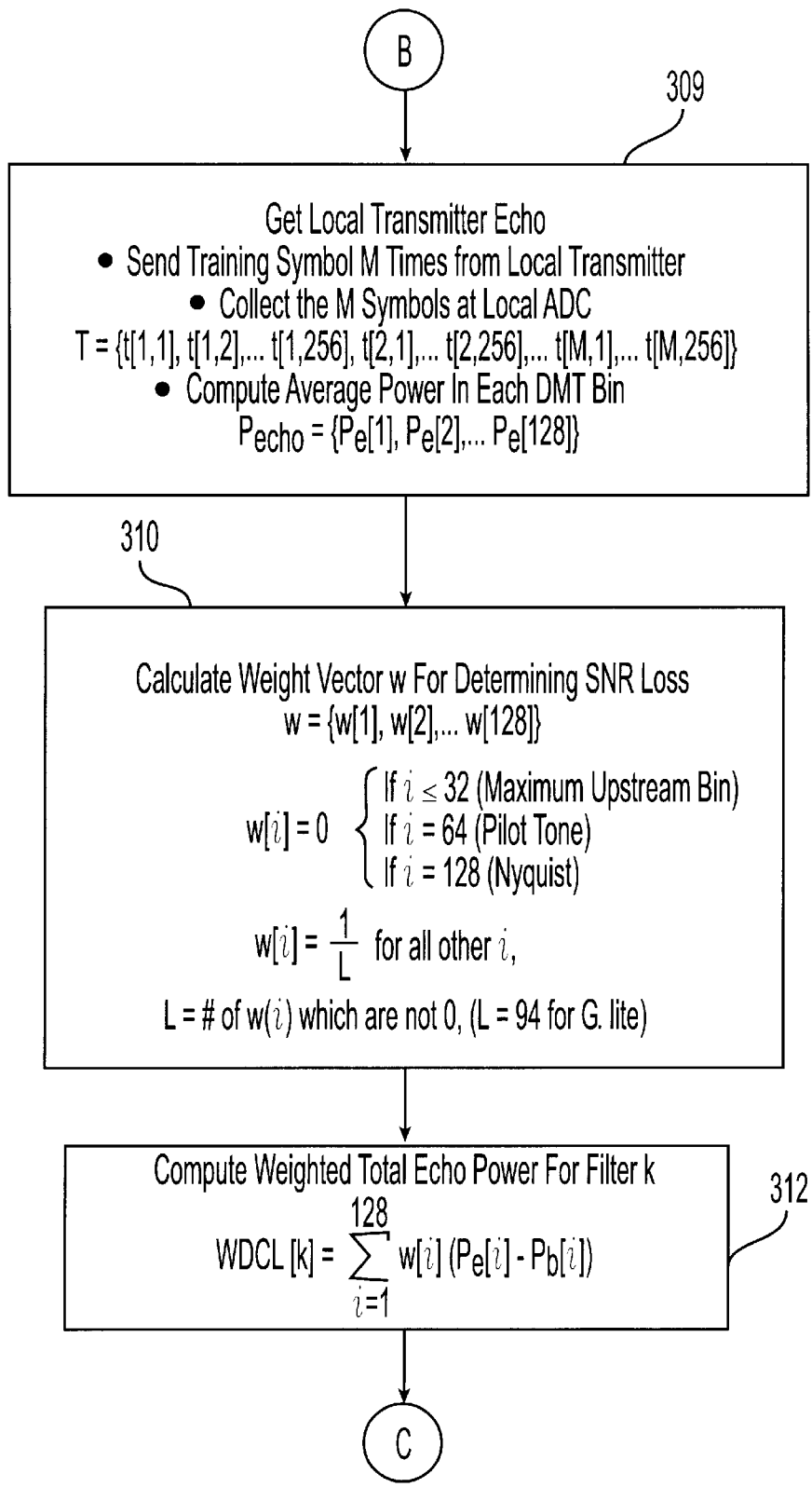
Figure 6C:
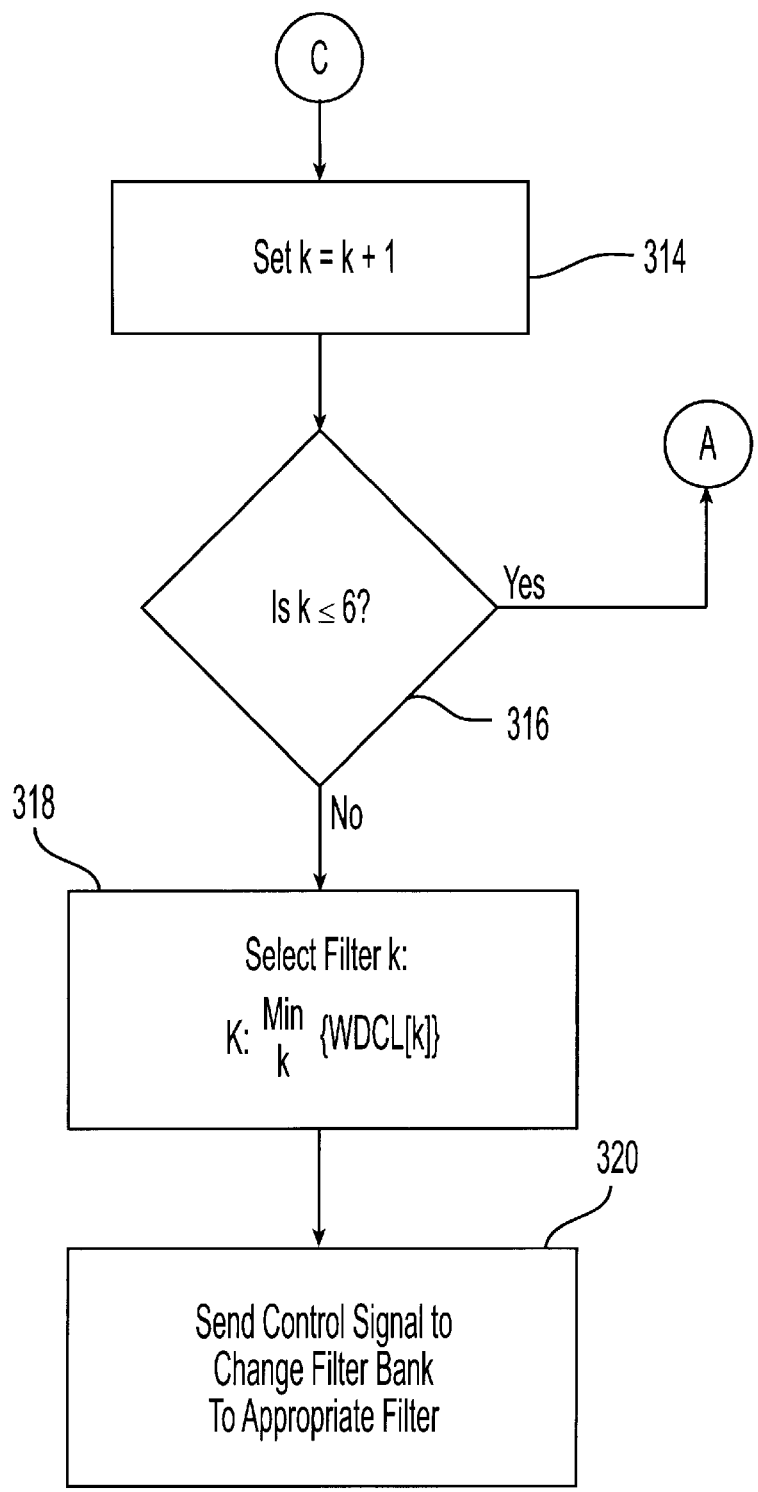

FIGS. 6A–6C present a flow chart 300 showing the general algorithm for determining which of the several filters are to be used during a DSL session. In step 302, the xDSL is powered up. It should be noted, however, that measurement and filter selection procedure is normally performed at the start, or restart of a DSL session, the latter being long after power up. At step 304, the receiver circuitry is initialized to prepare for taking measurements. In a preferred embodiment, the background noise level is to be measured and so the gain is set to maximum, since no signal is expected. In addition, the filter setting giving the widest receiver bandwidth (i.e., the smallest guard band) is used. Finally a counter k, which keeps track of which filter is being used, is set to k=1.

In step 306, the background noise level is calculated. For this, the local transmitter is turned off and a background noise signal is taken from the output of the modem's ADC, which is downstream of the receiver filters. The background noise signal comprises a number of noise samples s[n]={s[1], s[2], . . . , s[N1]}, collected at a sampling rate of at least 1.104 MHz for G.Lite (or 2.208 MHz for G.DMT, which is a full-rate ADSL). For G.Lite, at least N1=256 samples must be taken to satisfy Nyquist sampling to have a bin spacing of 4.3125 kHz. However, since we wish to perform noise averaging, far more than N1=256 samples should be taken. Preferably, N1≧1024, which is at least four times as long as needed to obtain the desired frequency resolution. More preferably, N1≧32768, which is at least 128 times as long as needed to obtain the desired frequency resolution of 4.3125 kHz for G.Lite.

Given the sampled background noise signal s[n], an estimate of the background noise power $P_b=\{P_b[1], P_b[2], \ldots, P_b[128]\}$ can be then calculated for each of the 128 frequency bins (for G.Lite) of interest. As is known to those skilled in the art, this can be done in a number of ways. One way is to take the square of the FFT of s[n] to form an estimate of the power spectrum. Another is to take the FFT of the autocorrelation of s[n] to arrive at a measure of the power spectrum. Other approaches may also be used, the idea being to estimate the noise energy in the frequency bins of interest.

In a preferred embodiment, the FFT of N1=32768 samples of s[n] is taken to form S[k], and the square of each element of S[k] is used as an estimate of the power in the various frequency bins. Since N1=32768 is considerably greater than the number of samples needed to satisfy Nyquist criteria, the frequency resolution of S[k] is much greater than needed. Therefore, a number of adjacent bins in the frequency domain can be used to provide an estimate of the power spectrum at the frequencies of interest. In particular, a number of adjacent frequency bins are summed to estimate the power spectra for each of the specific frequencies of interest.

In step 308, the local transmitter echo is calculated. For this, only the local transmitter (typically the ATU-R modem) is active and M symbols, M≧1, are sent. The M symbols of samples are collected at the ADC 210 of the ATU-R modem to form the transmit echo signal T={t[1,1], t[1,2], . . . , t[1,256], t[2,1], . . . , t[M,1], . . . , t[M,256]}. It should be noted here that the measured local transmit echo signal is corrupted by the aforementioned background noise. The transmit echo power $P_e=\{P_e[1], P_e[2], \ldots, P_e[128]\}$ for each frequency bin is then calculated from the transmit echo signal T. Preferably a single symbol is repeated M times. This allows one to time-average the M received symbols to help reduce the effect of variations in background noise. The power spectrum of the resulting, time-averaged symbol (which is 256-points long) is then taken, either by taking the square of its FFT, the FFT of its autocorrelation, or other technique.

In step 310, a frequency-domain weight vector W={w[1], w[2], ..., w[128]} for determining a weighted loss in data capacity is calculated. Preferably, the weight vector is non-zero only in those frequency bins which can be used for downstream communication. The weights within weight vector W may be determined in a number of ways. One strategy is to weight them equally—if there are total of L non-zero weights, then each of these can have a value of 1/L. In such case.

At step 312, the weighted data capacity loss (DCL) for the $k^{th}$ filter is calculated according to:

$$WDCL[k] = \sum_{i=1}^{128} w[i](P_e[i] - P_b[i]) \quad \text{(Eq. 1)}$$

If the L non-zero weights are weighted by 1/L, this calculation is effectively the average loss in data capacity in the L downstream bins and so the WDCL serves as a metric to gauge the average loss in data capacity in the frequency bins. This metric is then used to compare the performance of the candidate filters. While Eq. 1 presents a preferred embodiment of how to calculated the loss in data capacity, it should be kept in mind that other metrics may also be used. Any such metric preferably would provide a value reflective of the performance of the system, such as the usable bandwidth or throughput of the system. Thus, measurements of SNR, data capacity, and the like, across the bins of interest, can be used for this purpose.

In a preferred embodiment using G.Lite, a maximum of L=94 of the 128 bins can be used for downstream data. This is because bins 1–32 are used for upstream traffic and POTS, bin 64 is used for a pilot tone, and bin 128 is not used because it is the Nyquist frequency; w[i] for each of these 34 bins is set to zero, leaving a total of L=94 bins which may be used for downstream data transmission. In a preferred embodiment, for G.Lite, the corresponding 94 weights are equal to each other and so w[i]=1/94 for each of the 94 bins in which downstream data may be transmitted.

At step 314, the index k is incremented, and at step 316, it is determined whether a WDCL has been calculated for all the candidate filters. If not, steps 306–314 are repeated to calculate the WDCL for the next candidate filter. If, on the other hand, the WDCL has been calculated for all the candidate filters, control flows to step 318, where the filter which provides the lowest WDCL is selected. Once this is done, the controller 202 sends the appropriate signals to select that filter for the remainder of the communication session.

In the above description, specific values for the number of candidate filters (6), the number of bins (128), the index of the pilot tone (64), the highest upstream frequency bin (32), and the Nyquist bin (128) were provided. One skilled in the art will readily recognize, however, that the general principles apply to other numbers, as well. Therefore, the present invention can be used with xDSL modems and other FDM-type communication systems in which a guard band is provided between the upstream and downstream frequency bins, and it is desirable to narrow the guard band so as to maximize the overall bandwidth. Thus, the principles of the present invention may also apply to, say, a G.DMT modem (i.e., full-rate xDSL having 256 frequency bins), in which case a total of L=222 non-zero bins would be available for downstream communication. It should also be noted that in the above flow chart, it makes no difference whether the background noise or the local transmit echo is calculated first. It also makes no difference whether the WDCLs are calculated as each filter is attempted, or at the end, after all the data has been gathered. What is significant that some metric(s) be calculated and used in some manner to select from among the candidate filters.

In the first preferred embodiment described above, the non-zero weights w[i] are all set to be equal to another in the WDCL metric. It should be noted, however, that one may instead elect to use non-uniform weighting schemes, since there are various ways of defining weighting factors depending on the design goal. For example, one may choose to prefer the lower frequency bins of the downstream band. In such case, one may weight the channels from 32 to 128 (excluding pilot channel 64) inversely proportional to the bin number. Such a scheme may be employed to combat clock jitter, which is prevalent in the higher frequency bins. Another strategy may be to weight them linearly with frequency, or even inversely proportional to frequency. Other techniques may assign weights based on some function of the background noise, the echo power, or other metric.

In a second preferred embodiment, the measurement mechanism also receives two different types of signals: (1) a first, locally active period in which the local transmitter is active, so as to determine local echo power, and (2) a second, remotely active period in which one or more signals comprising several tones spaced apart in frequency are sent by the remote transmitter (usually at the ATU-C), so as to gauge channel loss. In the first period, the local transmit echo power $P_e$ is calculated, as discussed above. In the second period, the channel loss $P_c$ is calculated based on the difference between the known signal transmitted from the ATU-C and the signal received at the ATU-R's ADC. If less than all tones are sent by the ATU-C, one may interpolate the received tonal values to estimate the channel loss across the relevant receive frequency bins. The ratio of these powers is the signal-to-noise ratio: SNR=Pc/Pe, which is then given for each bin, at each candidate filter setting. As is known to those skilled in the art, one can then calculate the bit rate for each candidate filter from the SNR. The candidate filter which gives the highest bit rate is then chosen for that session.

Figure 7:
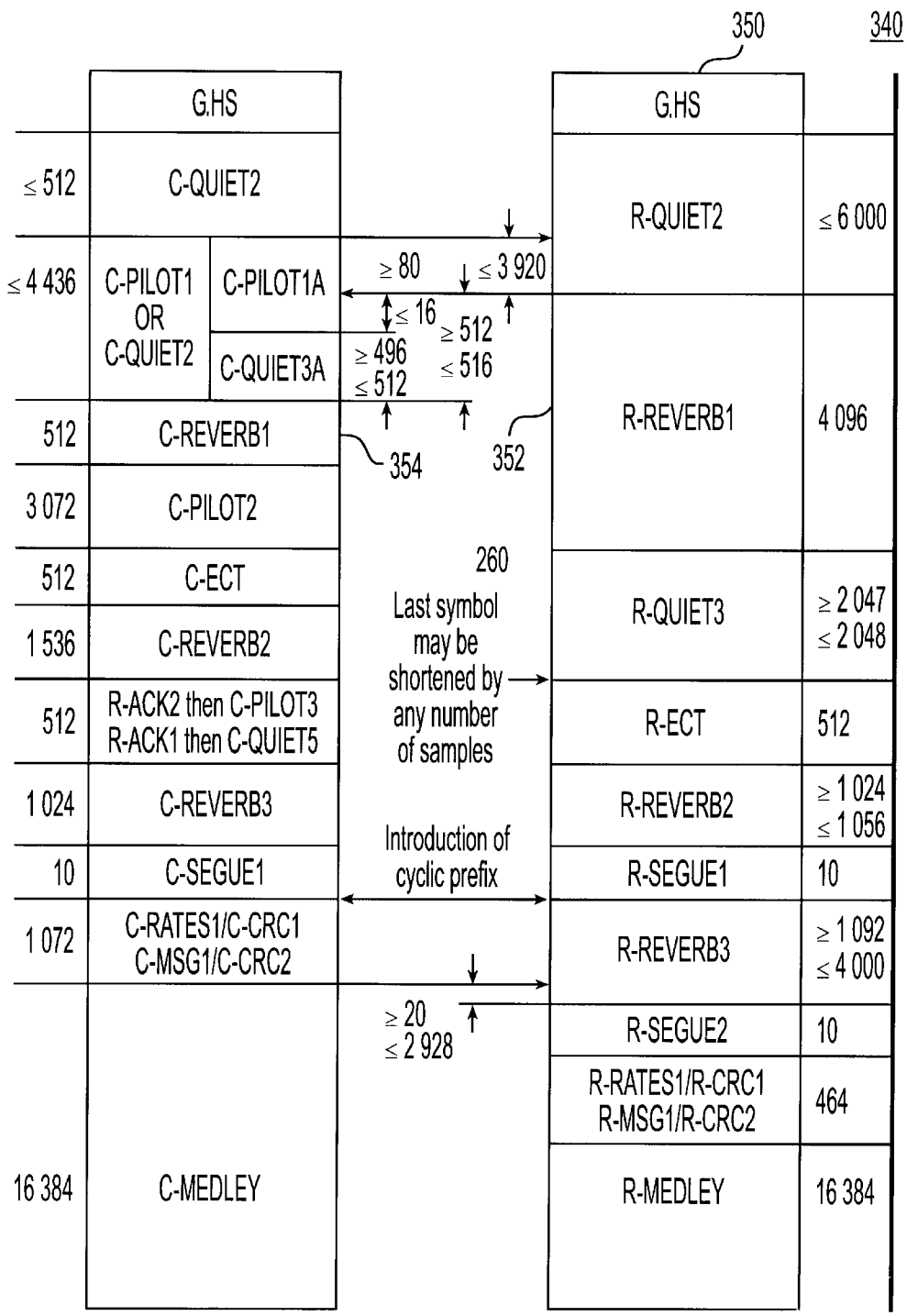
FIG. 7 is a timing diagram of the training process for a G.992.1 and G.992.2 modem illustrating how the present invention can be used with such a modem.

The present invention may also be described with respect to implementing the above steps for use with a modem designed to meet the G.991.2 and G.992.2 specifications. FIG. 7 is a timing diagram 340 for a portion of the training process for a G.991.2 or a G.992.2 modem illustrating how the present invention can be used with such a modem. In the timing diagram of FIG. 7, the phases on the left side of the figure, i.e., those beginning with a "C" designation, refer to phases at the ATU-C while the phases on the right side of the figure, i.e., those beginning with an "R" designation, refer to phases at the ATU-R. A preferred embodiment for implementing the present invention in on such a modem may proceed with the following steps and timing:

(1) As discussed above, the background noise profile is obtained after modem power up and self-test. These events take place prior to the training process, which begins with phase G.HS 350, as seen in FIG. 7.

(2) Preferably, the data gathering, calculation of all WDCLs and final selection of the filter, are all performed during symbols of training phase R-REVERB-1 352. More preferably, they are performed before the data from C-REVERB1 354 is received. This allows one to easily separate locally generated signals and background noise from end generated signals. In general, it is preferred that all needed signal data be acquired, and the analog filter selected as early as possible, since the selected analog filter will be used in the remainder of the initialization sequence. While in this preferred embodiment, these actions are performed during the R-REVERB1 phase, it should be noted that these steps can also be carried out during other phases, such as during an R-REVERB phase of a fast retrain procedure.

The timing diagram of FIG. 7 pertains to a modem following the G.992.1 and G.992.2 standards, and the steps presented above are suitable for this modem. However, the present invention is not limited to applications using this modem only. Timing sequences for modems following other standards may also be modified to accommodate the methodology of the present invention. Accordingly, modems following different standards may incorporate the necessary hardware and software required to implement the present invention.

Finally, while the above invention has been described with reference to certain preferred embodiments, it should be kept in mind that the scope of the present invention is not limited to these. One skilled in the art may find variations of these preferred embodiments which, nevertheless, fall within the spirit of the present invention, whose scope is defined by the claims set forth below.

What is claimed is:

1. An xDSL modem comprising:

receiver circuitry including a filter bank comprising a plurality of filters having a corresponding plurality of cut-off frequencies spaced apart from one another within a frequency band situated between an upstream and a downstream channel associated with said modem; and a controller configured to select at least one of said plurality of filters for use during an xDSL session.

2. The xDSL modem of claim 1, wherein said plurality of filters are analog filters implemented with discrete components.

3. The xDSL modem of claim 2, wherein said filter bank comprises a tunable filter having at least one tunable component configured to realize said plurality of cut-off frequencies.

4. The xDSL modem of claim 1, wherein said filter bank comprises a tunable filter having at least one tunable component configured to realize said plurality of cut-off frequencies.

5. The xDSL modem of claim 1, wherein said plurality of cut-off frequencies are evenly spaced in said frequency band.

6. The xDSL modem of claim 1, wherein said modem is configured to calculate a background noise power and a local transmitter echo power for each filter setting, and at each receiver frequency bin.

7. The xDSL modem of claim 6, wherein said modem is further configured to calculate a metric reflective of data capacity loss for each filter setting from said background noise power and said local transmitter echo power.

8. The xDSL modem of claim 7, wherein said modem is further configured to select that filter having a metric reflective of minimum data capacity loss.

9. The xDSL modem of claim 7, wherein the metric for the $k^{th}$ filter is given by:

$$WDCL[k] = \sum_{i=1}^{N} w[i](P_e[i] - P_b[i]) \quad \text{(Eq. 1)}$$

wherein $P_e[i]$ is the local transmitter echo for the $i^{th}$ frequency bin, $P_b[i]$ is the background noise level for the $i^{th}$ frequency bin, $w[i]$ is a weighting function for the $i^{th}$ frequency bin and is derived in part from the background noise level and the local transmitter echo, and N is the total number of frequency bins.

10. A method of establishing a width of a guard band in a full-duplex frequency division multiplexed (FDM) communication device, the method comprising:

measuring background noise level at a first transceiver;

measuring local transmitter echo of said first transceiver; and selecting one from among a plurality of receiver filters, based on results of said measuring steps, wherein a cut-off frequency of said one filter establishes one end of said guard band.

11. The method of claim 10, wherein the selecting step comprises calculating a metric reflective of data capacity loss to determine which of said plurality of receiver filters is to be selected.

12. The method of claim 10, comprising:

measuring background noise level and local transmitter echo for each of a plurality of candidate guard bands;

calculating a metric reflective of data capacity loss for each of said plurality of candidate guard bands; and selecting that guard band having a lowest metric reflective of data capacity loss among said plurality of guard bands, said metric being calculated from said background noise level and local transmitter echo.

13. The method of claim 10, wherein the measuring steps are carried out during a training sequence of said FDM communication device.

14. The method of claim 13, wherein the FDM communication device is an xDSL modem conforming to the ITU-T G.992.1 or G.992.2 standards.

15. The method of claim 14, wherein the measuring steps are carried out during a R-REVERB1 phase of a training sequence of said xDSL modem.

16. The method of claim 14, wherein the measuring steps are carried out during a R-REVERB phase of a training sequence of said xDSL modem.

17. The method of claim 16, wherein the measuring steps are carried out during a R-REVERB phase of a fast retrain of said xDSL modem.

18. The method of claim 10, wherein the FDM communication device is an xDSL modem conforming to either the ITU-T G.992.1 or 992.2 standards, or both, and the measuring steps are carried out during a R-REVERB1 phase of a training sequence of said xDSL modem.

19. An xDSL modem having at least one processor, said at least one processor having associated therewith at least one computer readable medium having computer executable software code stored thereon, said software code including:

code to measure background noise level of a transceiver of said modem;

code to measure local transmitter echo of said transceiver;

code to calculate at least one metric reflective of data capacity loss from measurements of said background noise level and local transmitter echo: and code to select one from among a plurality of receiver filters of said transceiver, based on said at least one metric.

20. The xDSL modem of claim 19, wherein said at least one computer readable medium comprises:
   code to measure background noise level and local transmitter echo for each of a plurality of candidate guard bands;
   code to calculate a metric reflective of data capacity loss for each of said plurality of candidate guard bands; and
   code to select that guard band having a lowest metric reflective of data capacity loss among said plurality of guard bands.

21. A computer readable medium having computer executable software code for an xDSL modem stored thereon, said software code including:
   code to measure background noise level of a transceiver of said modem;
   code to measure local transmitter echo of said transceiver;
   code to calculate at least one metric reflective of data capacity loss from measurements of said background noise level and local transmitter echo; and
   code to select one from among a plurality of receiver filters of said transceiver, based on said at least one metric reflective of data capacity loss.

22. The computer readable medium of claim 21, comprising
   code to measure background noise level and local transmitter echo for each of a plurality of candidate guard bands;
   code to calculate a metric reflective of data capacity loss for each of said plurality of candidate guard bands; and
   code to select that guard band having a lowest metric reflective of lowest data capacity loss among said plurality of candidate guard bands.

* * * * *